Sept. 2, 1952  H. T. LAMB  2,608,941
MIXING AND KNEADING MACHINE
Filed June 27, 1950
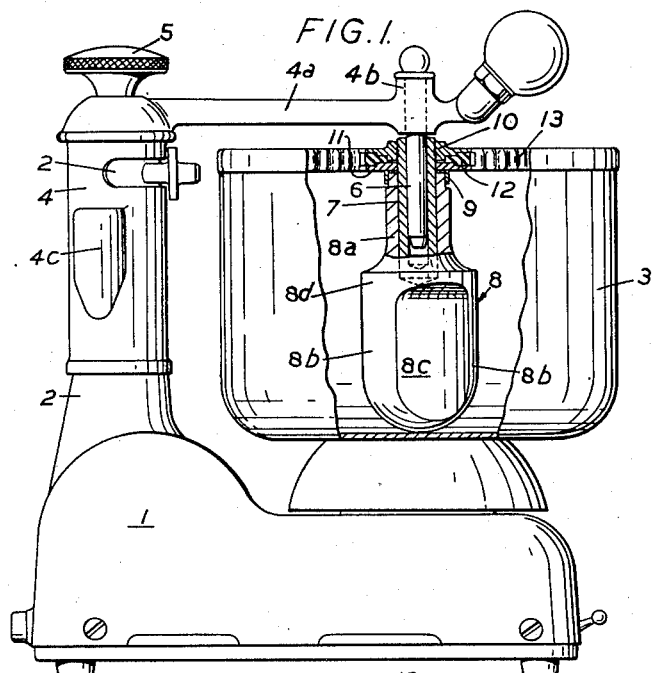
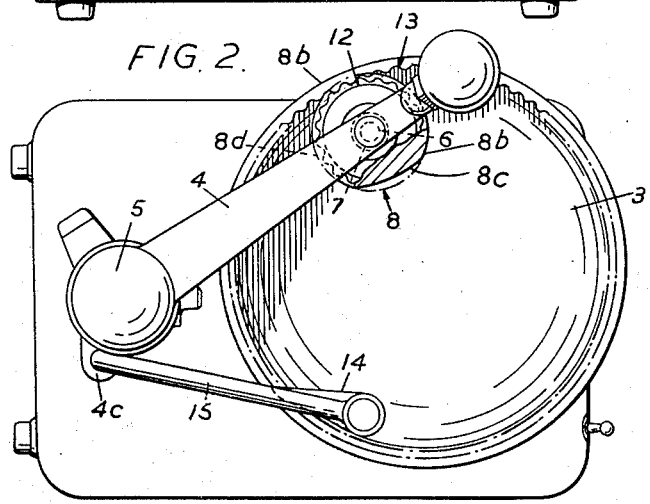
Inventor
Harold Thomas Lamb
By
Alexander M Dowell
Attorneys Patented Sept. 2, 1952

2,608,941

UNITED STATES PATENT OFFICE 2,608,941

MIXING AND KNEADING MACHINE

Harold Thomas Lamb, Newcastle-on-Tyne, England

Application June 27, 1950, Serial No. 170,622
In Great Britain November 25, 1949

7 Claims. (Cl. 107—33)

This invention relates to machines for mixing, kneading and similarly treating material, particularly for culinary purposes, of the kind comprising a driven mixing bowl and a beater or mixing dolly in driving relation with the upper portion of the bowl.

Although a machine according to this invention can be used for other purposes it is primarily intended for culinary use, for example in the mixing and/or kneading of the ingredients of cakes, bread, puddings and the like either domestically or in catering and similar establishments.

Hitherto the dolly has been driven from the bowl by means of a grooved pulley or disc at its upper end which engaged with an inwardly projecting rim on the upper portion of the bowl. Sometimes in the event of the mixture inadvertently being deposited on the bowl rim or on the dolly pulley, slipping occurred between the dolly and the bowl so that the mixing or beating operation was slowed down or was interfered with.

It is the object of the present invention to provide an improved drive between the bowl and the dolly whereby these drawbacks may be obviated.

According to the invention the upper portion of the bowl has formed thereon a toothed or serrated rim which engages with a correspondingly toothed or serrated disc rigid with the dolly.

In order to promote ready engagement between the teeth of the dolly disc and those of the mixing bowl rim and also to facilitate cleaning, the roots and crowns of the teeth are preferably rounded.

The dolly disc is preferably formed of a resilient material which must be impervious to the action of fats; for example it may be of synthetic rubber. Such a disc, owing to its resilience, promotes intimate and shock absorbing engagement between itself and the bowl rim. Furthermore, by making the said teeth of a resilient material, production of noise by the co-operation of the teeth on the dolly with those on the bowl is avoided. If desired the teeth on the rim of the bowl may be similarly formed of a resilient material or covered with such material. One only of the toothed members may be of resilient material, or both may be.

The teeth of the bowl may be provided on an inturned rim at the upper portion of the bowl and may project more or less horizontally inwardly for engaging similar teeth associated with the dolly, which teeth may be provided on a member fixed coaxially to the upper portion of the dolly or formed integrally therewith. Thus the upper end of the dolly may have a part in the nature of a peripherally toothed wheel or disc fixed coaxially thereto, the teeth of the disc engaging the corresponding inwardly directed teeth on the inwardly directed rim of the bowl.

In machines of the kind referred to, it is usual for the dolly to rotate about a non-rotatable vertical spindle and in that case, the teeth for co-operation with the bowl will be on the dolly or on a part fixed thereto as above described, but if the dolly were to be rigidly mounted upon a rotary spindle, then the said teeth could be provided on this spindle or a part fixed thereto.

According to a further feature of the invention the body of the said dolly may be in the form of a cam so that as the dolly rotates it has a beating effect upon the materials disposed between it and the inner surface of the peripheral wall of the bowl and, if desired, the said co-operating teeth on the dolly and the bowl may be of a sufficient radial length to ensure that the dolly and the bowl will remain in driving inter-engagement in spite of the eccentricity of the body portion thereof. Preferably, however, the body of the dolly has circular marginal portion which is coaxial with its axis and which is adapted to contact with the inner wall of the bowl so that the meshing of the dolly teeth with those of the bowl is constant.

The invention will now be described by way of example with reference to the accompanying drawings which show it applied to an electrically driven mixing and kneading machine of the type hereinbefore referred to in which the bowl is detachable from a vertical driving shaft driven through gearing from an electric motor, wherein the dolly is mounted about a dependent vertical non-rotating spindle or pin carried by a horizontal arm radiating from a supporting column arranged upon a base to one side of the bowl.

In the said drawings:

Fig. 1 is a side elevation partly in section.
Fig. 2 is a plan of Fig. 1.

Referring more particularly to the drawings the mixing machine has an electric motor (not shown) housed within a hollow rectangular base 1 having an upstanding rear column 2. A cylindrical bowl 3 is adapted to engage the upper end of a vertical spindle (not shown) driven by the motor so that the bowl is rotated by the latter. A vertical sleeve 4 carrying a headed horizontal arm 4a is pivotally mounted about the rear column 2, and adapted to be resiliently pressed towards the inner wall of the bowl 3 and a clamping screw 5 serves for locking the sleeve and arm after angular adjustment thereof.

The arm 4a has formed at its free end a boss 4b from which depends a vertical pin 6 on which is slidably mounted the dolly assembly. The dolly assembly comprises a non-ferrous sleeve 7 slidable on the pin 6, the said sleeve being a driving fit in a bore formed in a dolly proper 8 which is of hardwood.

When in its operative position the dolly 8 rests on the bottom of the bowl, its lower end being shaped to fit into the radius thereof. The dolly 8 has a reduced neck portion 8a at its upper portion and the upper end of this portion has fitted over it a ferrule 9. The upper end of the sleeve 7 is threaded to engage one of a pair of stepped discs 10, 11 the lower of which passes over the plain portion of the sleeve 7. The two discs between them hold rigidly a toothed annulus 12 of synthetic or vulcanised rubber or the equivalent to form a pinion which meshes with a corresponding internally toothed non-ferrous annulus 13 fitted in an internal peripheral groove in the upper portion of the bowl 3.

In order to promote ready engagement between the teeth of the annuli 12 and 13, the roots and crowns of the teeth are rounded as shown.

The lower or kneading portion of the dolly 8 is of a double symmetrical cam shape having two rises 8b whose surfaces are coaxial with the dolly axis, the larger surfaces 8c being segmental in cross section. At the upper end there is a narrow cylindrical portion 8d which maintains the dolly axis at a constant distance from the side of the bowl so that the two annuli 12 and 13 are in constant mesh.

The dolly is fitted to the machine merely by sliding it up the pin 6 and allowing it to rest on the bottom of the bowl.

A scraper 14 is suspended from a second horizontal arm 15 pivoted in a bearing 4c at one side of the sleeves 4, the said scraper bearing against the internal periphery of the bowl 3. For convenience the scraper assembly is omitted in Fig. 1.

In use, the dolly pinion 12 is engaged with the toothed rim of the bowl 3 and the materials to be mixed are placed therein. On the bowl 3 being rotated by the motor, the dolly 8 is also rotated in the same direction, and its cam-like kneading portion functions to feed and squeeze the materials against the wall of the bowl 3. Lumps of butter, fat and similar compact material coming against the dolly 8 are pressed thereby against the wall of the bowl 3 and as the wider portions of the dolly come into contact with the lumps the latter are subjected to repeated impacts which cause them to be more effectively broken down or flattened than occurs with a simple rolling action. As the bowl and the dolly simultaneously revolve, the lumps are continuously flattened out and urged onwards between the dolly and the bowl wall without bringing the dolly to a standstill, thereby facilitating the mixing process.

In the event of some of the mixture coming into contact with the toothed rim or the toothed dolly disc the positive engagement between the two is still maintained, and the mixing is still carried out as if there were full engagement; whereas the mixing would at once cease were the drive one of friction. Then in the event of some of the mix being stiff so that there is a tendency for the dolly to be pushed away from the bowl rim a certain amount of movement of the dolly from the bowl can take place without disengagement occurring between the dolly disc and the bowl rim. In the event of disengagement ultimately taking place, then as soon as the particular portion of stiff dough between the two members had been dealt with, the rounded form of the teeth would enable instantaneous engagement to take place. Hence the mixing is carried out more efficiently and more rapidly than with a friction drive between the bowl and the dolly.

I claim:

1. A machine for mixing and kneading and similarly treating material, of the kind comprising a vertical mechanically driven mixing bowl and a vertical mixing dolly inside said bowl and in driving relation therewith so as to be driven by said bowl, wherein on the inside of said bowl there is provided a toothed rim and a correspondingly toothed disc on said dolly, said toothed rim and toothed disc being adapted to mesh with each other, the dolly having formed in its upper portion a coaxial bore, a non-ferrous sleeve rigidly held in said bore, a swinging horizontal arm on said machine, a downwardly directed vertical pin on said horizontal arm, said sleeve being adapted to pass over said vertical pin, a pair of stepped discs mounted on the upper end of said sleeve, and a toothed annulus of resilient material rigidly mounted between the stepped portions of said discs, the diameter of said discs being such as to leave only the toothed portion of said annulus exposed, the teeth of which toothed portion are adapted for engagement with the teeth on the bowl.

2. In a machine of the character described, a rotatable bowl having teeth on its walls a toothed dolly having formed in its upper portion a coaxial bore, a non-ferrous sleeve rigidly held in said bore, a swinging horizontal arm on said machine, a downwardly directed vertical pin on said horizontal arm, said sleeve being adapted to pass over said vertical pin, a pair of stepped discs mounted on the upper end of said sleeve, and a toothed annulus of resilient material rigidly mounted between the stepped portions of said discs, the diameter of said discs being such as to leave only the toothed portion of said annulus exposed, the teeth of which toothed portion are adapted for engagement with the teeth on the bowl.

3. A machine for mixing, kneading, and similarly treating material, comprising a vertically disposed mixing bowl having a rim and side walls having a bottom; means for rotating said bowl; a vertical mixing dolly within and seating upon the bottom of said bowl having side walls and being adapted to be driven by the bowl so as to rotate therewith at the same peripheral speed and in the same direction; annular teeth on the inside of the bowl rim; a horizontally swingable arm overlying the bowl on which the dolly is freely rotatably mounted; a toothed disc on said dolly adapted to directly mesh with the annular teeth of the bowl when the arm is swung to bring the side walls of the dolly substantially into contact with the side walls of the bowl.

4. A machine for mixing and kneading and similarly treating material, comprising a vertically disposed mixing bowl having a rim and substantially cylindrical walls and having a bottom; power means for rotating said bowl; a vertical mixing dolly within and seating upon the bottom of said bowl having substantially cylindrical side walls and being adapted to be driven by the bowl so as to rotate therewith at the same peripheral speed and in the same direction; annular rounded teeth on the inside of the bowl rim; a horizontally swingable arm overlying the bowl on which the dolly is freely rotatably mounted; and a resilient toothed disc on said dolly adapted to directly mesh with the annular teeth of the bowl when the arm is swung to bring the side walls of the dolly substantially into contact with the side walls of the bowl.

5. A machine for mixing and kneading and similarly treating material, comprising a vertically disposed mixing bowl having a rim and substantially cylindrical walls and having a bottom; power means for rotating said bowl; a vertical mixing dolly within and seating upon the bottom of said bowl having substantially cylindrical side walls and being adapted to be driven by the bowl so as to rotate therewith at the same peripheral speed and in the same direction; annular rounded teeth on the inside of the bowl rim; a horizontally swingable arm overlying the bowl on which the dolly is freely rotatably mounted; a resilient toothed disc on said dolly adapted to directly mesh with the annular teeth of the bowl when the arm is swung to bring the side walls of the dolly substantially into contact with the side walls of the bowl; and means for maintaining the arm in said position.

6. In a machine according to claim 5, said toothed rim comprising an inturned rim at the upper portion of the bowl having formed thereon substantially horizontally and inwardly projecting teeth.

7. In a machine according to claim 6, the bowl having formed thereon an internal groove in the periphery of the bowl and said toothed rim comprising a separate internally toothed ring held rigid in the said groove.

HAROLD THOMAS LAMB.

REFERENCES CITED

The following references are of record in the file of this patent:

UNITED STATES PATENTS

| Number | Name | Date |
| --- | --- | --- |
| 522,806 | Snook | July 10, 1894 |
| 777,757 | Simon | Dec. 20, 1904 |
| 1,714,359 | Ganabon | May 21, 1929 |
| 2,270,164 | Du Rietz et al. | Jan. 13, 1942 |